(12) United States Patent
Arnold et al.

(10) Patent No.: US 6,446,070 B1
(45) Date of Patent: Sep. 3, 2002

(54) METHOD AND APPARATUS FOR DYNAMIC DISTRIBUTED COMPUTING OVER A NETWORK

(75) Inventors: Kenneth C. R. C. Arnold, Lexington; James H. Waldo, Dracut; Ann M. Wollrath, Groton; Peter C. Jones, Winchester, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/030,840

(22) Filed: Feb. 26, 1998

(51) Int. Cl.[7] .................................................. G06F 9/00
(52) U.S. Cl. ............................................ 707/10; 707/8
(58) Field of Search ...................................... 707/1–224

(56) References Cited

U.S. PATENT DOCUMENTS

| 4,491,946 A | 1/1985 | Kryskow, Jr. et al. |
| 4,713,806 A | 12/1987 | Oberlander et al. |

(List continued on next page.)

FOREIGN PATENT DOCUMENTS

| EP | 0 300 516 A2 | 1/1989 |
| EP | 0 351 536 A3 | 1/1990 |
| EP | 0 384 339 A3 | 2/1990 |
| EP | 0 472 874 A1 | 3/1992 |
| EP | 0 474 340 A2 | 3/1992 |

(List continued on next page.)

OTHER PUBLICATIONS

Alexander et al., "Active Bridging," Proceedings of the ACM/SIGCOMM'97 Conference, Cannes, France, Sep. 1997.

Anonymous, "Change–Notification Serivce for Shared Files," IBM Technical Disclosure Bulletin, vol. 36, No. 8, pp. 77–82, XP002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Beech et al., "Object Databases as Generalizations of Relational Databases," Computer Standards & Interfaces, vol. 13, Nos. 1/3, pp. 221–230, Amsterdam, NL, Jan.1991.

Bertino et al., "Object–Oriented Database Management Systems: Concepts and Issues," Computer, vol. 24, No. 4, pp. 33–47, Los Alamitos, CA, Apr. 1991.

(List continued on next page.)

*Primary Examiner*—Thomas Black
*Assistant Examiner*—John G. Mills
(74) *Attorney, Agent, or Firm*—Finnegan, Henderson, Farabow, Garrett & Dunner, LLP

(57) ABSTRACT

A homogeneous execution environment operates within a heterogeneous client-server network. A client selects a server and transmits a procedure call with parameters. In response, the system dynamically and securely downloads code to a compute server; invokes a generic compute method; executes the code on the compute server; and returns the results to the calling client method, preserving the result on the compute server if requested. This technique is efficient in that it does not require multiple copies of code to be downloaded or compiled since server byte-codes can be executed on each of the different systems. The code can be compiled once and downloaded as needed to the various servers as byte-codes and then executed.

16 Claims, 5 Drawing Sheets

U.S. PATENT DOCUMENTS

| | | |
|---|---|---|
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 5,088,036 A | 2/1992 | Ellis et al. ................... 395/425 |
| 5,109,486 A | 4/1992 | Seymour |
| 5,187,787 A | 2/1993 | Skeen et al. ................. 395/600 |
| 5,218,699 A | 6/1993 | Brandle et al. |
| 5,257,369 A | 10/1993 | Skeen et al. ................. 395/650 |
| 5,293,614 A | 3/1994 | Ferguson et al. ........... 395/600 |
| 5,297,283 A | 3/1994 | Kelly, Jr. et al. |
| 5,307,490 A | 4/1994 | Davidson et al. ........... 709/328 |
| 5,311,591 A | 5/1994 | Fischer |
| 5,339,435 A | 8/1994 | Lubkin et al. |
| 5,386,568 A | 1/1995 | Wold et al. |
| 5,390,328 A | 2/1995 | Frey et al. |
| 5,423,042 A | 6/1995 | Jalili et al. |
| 5,440,744 A | 8/1995 | Jacobson et al. |
| 5,448,740 A | 9/1995 | Kiri et al. |
| 5,452,459 A | 9/1995 | Drury ............................ 707/3 |
| 5,455,952 A | 10/1995 | Gjovaag |
| 5,471,629 A | 11/1995 | Risch |
| 5,475,792 A | 12/1995 | Stanford et al. |
| 5,475,817 A | 12/1995 | Waldo et al. |
| 5,481,721 A | 1/1996 | Serlet et al. |
| 5,504,921 A | 4/1996 | Dev et al. |
| 5,511,197 A | 4/1996 | Hill et al. |
| 5,524,244 A | 6/1996 | Robinson et al. |
| 5,548,726 A | 8/1996 | Pettus ........................ 709/221 |
| 5,553,282 A | 9/1996 | Parrish et al. |
| 5,555,367 A | 9/1996 | Premerlani et al. |
| 5,555,427 A | 9/1996 | Aoe et al. .................... 709/201 |
| 5,557,798 A | 9/1996 | Skeen et al. ................. 395/650 |
| 5,560,003 A | 9/1996 | Nilsen et al. ................. 395/600 |
| 5,561,785 A | 10/1996 | Blandy et al. .......... 395/497.01 |
| 5,577,231 A | 11/1996 | Scalzi et al. |
| 5,594,921 A | 1/1997 | Pettus .......................... 710/11 |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,768 A | 7/1997 | Periwal et al. |
| 5,652,888 A | 7/1997 | Burgess |
| 5,655,148 A | 8/1997 | Richman et al. ............ 395/828 |
| 5,659,751 A | 8/1997 | Heninger .................... 395/685 |
| 5,671,225 A | 9/1997 | Hooper et al. |
| 5,675,796 A | 10/1997 | Hodges et al. |
| 5,680,573 A | 10/1997 | Rubin et al. |
| 5,680,617 A | 10/1997 | Gough et al. |
| 5,684,955 A | 11/1997 | Meyer et al. |
| 5,689,709 A | 11/1997 | Corbett et al. |
| 5,706,435 A | 1/1998 | Barbara et al. |
| 5,706,502 A | 1/1998 | Foley et al. .................. 707/10 |
| 5,724,588 A | 3/1998 | Hill et al. |
| 5,727,145 A | 3/1998 | Nessett et al. |
| 5,737,607 A | 4/1998 | Hamilton et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey ........................ 707/203 |
| 5,748,897 A | 5/1998 | Katiyar ....................... 709/219 |
| 5,754,849 A | 5/1998 | Dyer et al. |
| 5,757,925 A | 5/1998 | Faybishenko |
| 5,761,656 A | 6/1998 | Ben-Shachar |
| 5,764,897 A | 6/1998 | Khalidi |
| 5,768,532 A | 6/1998 | Megerian |
| 5,774,551 A | 6/1998 | Wu et al. |
| 5,778,187 A | 7/1998 | Monteiro et al. ........... 709/231 |
| 5,778,228 A | 7/1998 | Wei |
| 5,778,368 A | 7/1998 | Hogan et al. |
| 5,787,425 A | 7/1998 | Bigus |
| 5,787,431 A | 7/1998 | Shaughnessy |
| 5,790,548 A | 8/1998 | Sistanizadeh et al. |
| 5,802,367 A | 9/1998 | Held et al. ................... 709/332 |
| 5,808,911 A | 9/1998 | Tucker et al. ............... 709/316 |
| 5,809,507 A | 9/1998 | Cavanaugh, III |
| 5,812,819 A | 9/1998 | Rodwin et al. ............... 703/23 |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar ....................... 709/203 |
| 5,829,022 A | 10/1998 | Watanabe et al. |
| 5,832,219 A | 11/1998 | Pettus ......................... 709/203 |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,129 A | 12/1998 | Wendorf et al. |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. ............ 709/332 |
| 5,875,335 A | 2/1999 | Beard |
| 5,878,411 A | 3/1999 | Borroughs et al. |
| 5,884,024 A | 3/1999 | Lim et al. |
| 5,884,079 A | 3/1999 | Furusawa |
| 5,887,134 A | 3/1999 | Ebrahim |
| 5,889,951 A | 3/1999 | Lombardi .................... 709/219 |
| 5,890,158 A | 3/1999 | House et al. |
| 5,892,904 A | 4/1999 | Atkinson et al. |
| 5,933,497 A | 8/1999 | Beetcher et al. |
| 5,935,249 A | 8/1999 | Stern et al. |
| 5,940,827 A | 8/1999 | Hapner et al. |
| 5,944,793 A | 8/1999 | Islam et al. ................. 709/220 |
| 5,946,485 A | 8/1999 | Weeren et al. |
| 5,946,694 A | 8/1999 | Copeland et al. |
| 5,956,509 A | 9/1999 | Kevner ....................... 709/330 |
| 5,966,531 A | 10/1999 | Skeen et al. |
| 5,969,967 A | 10/1999 | Aalad et al. .................... 700/2 |
| 5,987,506 A | 11/1999 | Carter et al. ................. 709/213 |
| 5,999,179 A | 12/1999 | Kekic et al. ................. 345/734 |
| 6,003,763 A | 12/1999 | Gallagher et al. |
| 6,009,113 A | 12/1999 | Woundy |
| 6,016,496 A | 1/2000 | Roberson .................... 707/103 |
| 6,026,414 A | 2/2000 | Anglin ........................ 707/204 |
| 6,031,977 A | 2/2000 | Pettus ......................... 709/230 |
| 6,061,699 A * | 5/2000 | DiCecco ..................... 707/513 |
| 6,061,713 A * | 5/2000 | Bharadhwaj ................ 709/203 |

FOREIGN PATENT DOCUMENTS

| | | |
|---|---|---|
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 705 A2 | 11/1994 |
| EP | 0 635 792 A2 | 1/1995 |
| EP | 0 651 328 A1 | 5/1995 |
| EP | 0 660 231 A2 | 6/1995 |
| EP | 0 718 761 A1 | 12/1995 |
| EP | 0 697 655 A2 | 2/1996 |
| EP | 0 767 432 A2 | 4/1997 |
| EP | 0 810 524 A1 | 5/1997 |
| EP | 0 778 520 A2 | 6/1997 |
| EP | 0 817 020 A2 | 7/1997 |
| EP | 0 794 493 A2 | 9/1997 |
| EP | 0 803 810 A2 | 10/1997 |
| EP | 0 803 811 A2 | 10/1997 |

| | | |
|---|---|---|
| EP | 0 805 393 A2 | 11/1997 |
| EP | 0 817 022 A2 | 1/1998 |
| EP | 0 817 025 A2 | 1/1998 |
| EP | 0 836 140 A2 | 4/1998 |
| GB | 2 253 079 | 8/1992 |
| GB | 2 262 825 | 6/1993 |
| GB | 2 305 087 | 3/1997 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |

OTHER PUBLICATIONS

Betz et al., "Interoperable Objects: Laying the Foundation for Distribution Object Computing," Dr. Dobb's Journal, vol. 19, No. 11, p. 18(3), Oct. 1964.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Implementing Remote Procedure Calls" ACM Transactions on Computer Systems, vol. 2, No. 1, pp. 39–59, Feb. 1984.

Dave et al., "Proxies, Application Interface, And Distributed Systems," Proceedings International Workshop On Object Orientation In Operating Systems, pp. 212–220, Sep. 24, 1992.

Deux et al., "The O2 System," Communications Of The Association For Computing Machinery, vol. 34, No. 10, pp. 34–38, Oct. 1, 1991.

Drexler et al., "Incentive Engineering for Computational Resource Management," The Ecology of Computation, Elsevier Science Publishers B.V., pp. 231–266, 1988.

Droms, "RFC 1541 Dynamic Host Configuration Protocol," <http://www.cis.ohiostate.edu/htbin/rfc/rfc 1541.html>, pp. 1–33, Oct. 1993.

Emms, "A Definition Of An Access Control Systems Language," Computer Standards And Interfaces, vol. 6, No. 4, pp. 443–454, Jan. 1, 1987.

Gosling et al., "The Java (TM) Language Specification," Addison–Wesley, 1996.

Gottlob et al., "Extending Object–Oriented Systems with Roles," ACM Transactions on Information Systems, vol. 14, No. 3, pp. 268–296, Jul. 1996.

Guth, "JavaOne; Sun to Expand Java Distributed Computing Effort," <http://www.sunworld.com/swol02/1998/swol–02–sunspots.html>, XP–002109935, P.1, Feb. 20, 1998.

Hamilton et al., "Subcontract: A Flexible Base For Distributed Programming," Proceedings of 14th Symposium of Operating System Principles, Dec. 1993.

Hartman et al., "Liquid Software: A New Paradigm For Networked Systems," Technical Report 96–11, Department of Comp. Sci., Univ. of Arizona, Jun. 1996.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM, "Chapter 6—Distibuted SOM (DSOM)," SOMobjects Developer Toolkit Users Guide, Version 2.1, pp. 6–1–6–90, Oct. 1994.

Jones et al., "Garbage Collection: Algorithms for Automatic Dynamic Memory Management," pp. 165–175, John Wiley & Sons, 1996.

Kay et al., "An Overview of the Raleigh Object–Oriented Database System," ICL Technical Journal, vol. 7, No. 4, pp. 780–798, Oxford, GB, Nov. 1991.

Kougiouris et al., "Support for Space Efficient Object Invocation in Spring," Sep. 1994.

Linholm et al., "The Java (TM) Virtual Machine Specification," Addison Wesley, 1996.

Mitchell et al., "An Overview of the Spring System," Feb. 1994.

Orfali et al., "The Essential Distributed Objects Survival Guide," Chapter 11:Corba Commercial ORBs, pp. 203–215, John Wiley & Sons, Inc., 1996.

Riggs et al., "Pickling State in the Java (TM) System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Waldo et al., "Events In An RPC Based Distributed System" Proceedings Of The 1995 USENIX Technical Conference, Proceedings USENIX Winter 1995 Technical Conference, New Orleans, LA, USA, 16–20, pp. 131–142, Jan. 1995.

Wilson et al., "Design of the Opportunistic Garbage Collector," Proceedings of the Object Oriented Programming Systems Languages And Applications Conference, New Orleans, vol. 24, No. 10, Oct. 1989.

Wu, "A Type System For An Objected–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Java™ Remote Method Invocation Specification, Oct. 1997.

Mullender, *Distributed Systems*, Second Edition, Addison–Wesley, 1993.

Howard et al., *Scale and Performance in a Distributed File System*, ACM Transactions on Computer Systems, vol. 6, No. 1, Feb. 1988, pp. 51–81.

Cardelli, *Obliq, A lightweight language for network objects*, Nov. 5, 1993, pp. 1–37.

Dijkstra, *Self–stabilizing Systems in Spite of Distributed Control*, Communications of the ACM, vol. 17, No. 11, Nov. 1974, pp. 643–644.

Ousterhout et al., *The Sprite Network Operating System*, Computer, IEEE, Feb. 1988, pp. 23–36.

Dourish, *A Divergence–Based Model of Synchrony and Distribution in Collaborative Systems*, Xerox Technical Report EPC–1194–102, 1994, pp. 1–10.

Sharrott et al., *ObjectMap: Integrating High Performance Resources into a Distributed Object–oriented Environment*, ICODP, 1995.

Birrell et al., *Grapevine: An Exercise in Distributed Computing*, Communications of the ACM, vol. 25, No. 4, Apr. 1982, pp. 260–274.

*Transparent Network Computing*, Locus Computing Corporation, Jan. 5, 1995.

Gray et al., *Leases: An Efficient Fault–Tolerant Mechanism for Distributed File Cache Consistency*, ACM, 1989, pp. 202–210.

Lamport et al., *The Byzantine Generals Problem*, ACM Transactions on Programming Language and Systems, vol. 4, No. 3, Jul. 1982, pp. 382–401.

Dolev et al., *On the Minimal Synchronism Needed for Distributed Consensus*, Journal of the ACM, vol. 34, No. 1, Jan. 1987, pp. 77–97.

Mummert et al., *Long Term Distributed File Reference Tracing: Implementation and Experience*, Carnegie Mellon University School of Computer Science, Nov. 1994, pp. 1–28.

Gelernter et al., *Parallel Programming in Linda*, Yale University, Jan. 1985, pp. 1–21.

Cannon et al., *Adding Fault–Tolerant Transaction Processing to LINDA*, Software–Practice and Experience, vol. 24(5), May 1994, pp. 449–466.

Kambhatla et al., *Recovery with Limited Replay: Fault–Tolerant Processes in Linda*, Oregon Graduate Institute, Technical Report CSIE 90-019, Sep. 1990, pp. 1–16.

Anderson et al., *Persistent Linda: Linda + Transactions + Query Processing*, Proceedings of the 13th Symposium on Fault Tolerant Systems, 1994, pp. 93–109.

Gelernter, *Generative Communication in Linda*, ACM Transactions on Programming Languages and Systems, vol. 7, No. 1, Jan. 1985, pp. 80–112.

Carriero et al., *Distributed Data Structures in Linda*, Principals of Programming Language, 1986, pp. 1–16.

Pinakis, *Using Linda as the Basis of an Operating System Microkernel*, University of Western Australia, Department of Computer Science, Aug. 1993, pp. 1–165.

Linda Database Search, Jul. 20, 1995, pp. 1–68.

Carriero et al, *Distributed Data Structures in Linda*, Yale Research Report YALEU/DCS/RR–438, Nov. 1985.

Agha et al., *Actorspaces: An Open Distributed Programming Paradigm*, University of Illinois, Report No. UTUCDCS–R–92–1766, Open Systems Laboratory TR No. 8, Nov. 1992, pp. 1–12.

Ahmed et al., *A Program Building Tool for Parallel Applications*, Yale University, Dec. 1, 1993, pp.1–23.

Liskov et al., *Distributed Object Management in Thor* International Workshop on Distributed Object Management, 1992, p. 12.

Coulouris et al., *Distributed Systems Concepts and Designs*, Second Edition, Addison–Wesley, 1994.

Birrell et al., *Network Objects*, DEC SRC Research Report 115, Feb. 28, 1994.

Birrell et al., *Distributed Garbage Collection for Network Objects*, DEC SRC Research Report 116, Dec. 15, 1993.

Jaworski, *Java 1.1 Developer's Guide*, Sams.net, 1997.

Wollrath et al., *A Distributed Object Model for the Java™ System*, USENIX Association, Conference on Object–Oriented Technologies and Systems, Jun. 17–21, 1996.

Harris et al., *Proposal for a General Java Proxy Class for Distributed Systems and Other Uses*, Netscape Communications Corp., Jun. 25, 1997.

Hamilton, *Java and the Shift to Net–Centric Computing* Computer, Aug. 1996, pp. 31–39.

Chung et al.,*A 'Tiny' Pascal Compiler: Part 1: The P–Code Interpreter*, BYTE Publications, Inc., Sep. 1978.

Chung et al., *A 'Tiny' Pascal Compiler: Part 2; The P–Compiler*, BYTE Publications, Inc., Oct. 1978.

Thompson, *Regular Expression Search Algorithm*, Communications of the ACM, vol. II, No. 6, p. 149 et seq., Jun. 1968.

Mitchell et al., *Mesa Language Manual*, Xerox Corporation, No Date.

McDaniel, *An Analysis of a Mesa Instruction Set*, Xerox Corporation, May 1982.

Pier, *A Retrospective on the Dorado, A High–Performance Personal Computer*, Xerox Corporation, Aug. 1983.

Pier, *A Retrospective on the Dorado, A High–Performance Personal Computer*, IEEE Conference Proceedings, The 10th Annual international Symposium on Computer Architecture, 1983.

Krasner, *The Smalltalk–80 Virtual Machine*, BYTE Publications Inc., Aug. 1991, pp. 300–320. Operating Systems Review, ACM Press, vol. 27, No. 5, Dec. 1993, pp. 217–230.

Birrell et al., "Network Objects," Operating Systems Review, vol. 27, No. 5, pp. 217–230, Dec. 1993.

Burns et al., "An Analytical Study of Opportunistic Lease Renewal, "Distributed Computing Systems, ICEE 21st International Conference, pp. 146–153, Apr. 2000.

Gray et al., "Leases: An Efficient Fault–Tolerant Mechanism for Distributed File Cache Consistency," Proceedings of the 12th ACM Symposium on Operating Systems Principles, pp. 202–210, 1989.

Hoshi et al., "Allocation of the Cross–Connect Function in Leased Circuit Networks," 1992, ICC '92, Conference record, SUPERCOMM/ICC 92, A New World of Communications, IEEE International Conference, pp. 1408–1412.

McGrath, "Discovey and Its Discontents: Discovery Protocols for Ubiquitous Computing," Presented at Center for Excellence in Space Data and Information Science, NASA Goddard Space Flight Center, Apr. 5, 2000.

Venners, "Jini Technology, Out of the Box," JAVAWORLD, 'Online!, pp. 1–4, Dec. 1998.

Yin et al., "Using Leases to Support Server–Driven Consistency in Large–Scale Systems," Computer Services Department, University of Texas at Austin, pp. 285–294, May 26–29, 1998.

Yin et al., "Volume Leases for Consistency in Large–Scale Systems," IEEE Transactions on Knowlegde & Data Engineering, vol. 11, No. 4, pp. 563–576, Jul./Aug. 1999.

Aldrich et al., "Providing Easier Access to Remote Objects in Client–Server Systems," System Sciences, 1998, Proceedings of the 31st Hawaii Internat'l. Conference, Jan. 6–9, 1998, vol. 7, pp. 366–375, Aldrich et al., "Providing Easier Access to Remote Objects in Distributed Systems," Calif. Institute of Technology, www.cs.caltech.edu/%7Ejedi/paper/jedipaper.html, Nov. 21, 1997.

Dave et al., "Proxies, Application Interfaces, and Distributed Systems," XP 002009478, IEEE, pp. 212–220, Sep. 1992.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, 1998, Proceedings of the 31st Hawaii Internat'l. Conference, Jan. 6–9, 1998, pp. 574–578.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

IBM Technical Disclosure Bulletin, "Local Network Monitoring to Populate Access Agent Directory," vol. 36, No. 09A, pp. 403–405, Sep. 1993.

MUX–Elektronik, Java 1.1 Interactive Course, www.lls.se/~mux/javaic.html, 1995.

Stevenson, "Token–Based Consistency of Replicated Servers," IEEE, CH2686–4/89/0000/0179, pp. 179–183, 1989.

* cited by examiner

METHOD AND APPARATUS FOR DYNAMIC DISTRIBUTED COMPUTING OVER A NETWORK

BACKGROUND OF THE INVENTION

1. Field of the Invention

This invention generally relates to distributed computing systems and more particularly, to a method and apparatus for performing dynamic distributed computing over a network.

2. Description of the Related Art

In a distributed computing network, users can harness the processing capabilities of numerous computers coupled to the network. Tasks with many different independent calculations can be quickly processed in parallel by dividing the processing among different computers on the network. Further, specialized tasks can be computed more quickly by locating a computer on the network most suitable for processing the data. For example, a task executing on a client system which performs an intense floating point calculation may execute faster on a server system coupled to the network which has specialized floating point hardware suitable for the particular calculations.

Unfortunately, conventional techniques for distributed computing are not easily implemented in the typical heterogenous computing environments. Each computer on the network is typically heterogeneous containing different processor and operating system combinations, and require different object modules for execution. On the client side, different object modules requires that the user compiles different versions of the task for each different platform and loads the module onto the corresponding platform adding storage requirements to each client and also requiring porting and compiling the same tasks multiple times. Further, conventional techniques require that the code be distributed over the computers well before the code is executed. In the conventional systems, the extensive preparation required for performing distributed computing deterred many from exploiting this technology.

Distributed computing systems based on scripting languages are an improvement over some conventional distributed computing systems. Unfortunately, scripting based systems eliminate the need to recompile code, but are still very inefficient. A scripting based distributed system can execute the same instructions on multiple platforms because the language is interpreted by an interpreter located on each system. Consequently, most scripting languages are slow since they must translate high level scripting instructions into low level native instructions in real time. Moreover, scripting languages are hard to optimize and can waste storage space since they are not generally compressed.

Based on the above limitations found in conventional systems, it is desirable to improve distributed computing systems.

SUMMARY OF THE INVENTION

In one aspect of the present invention associated with a client computer, a method and apparatus for dynamic distributed computing is provided. Initially, the client selects a server from the network to process the task. This selection can be based on the availability of the server or the specialized processing capabilities of the server. Next, a client stub marshals the parameters and data into a task request. The client sends the task request to the server which invokes a generic compute method. The server automatically determines if the types associated with the task are available on the server and downloads the task types from the network as necessary. Information in the task types are used to extract parameters and data stored in the particular task request. The generic compute method is used to execute the task request on the selected server. After the server processes the task request, the client receives the results, or the computed task, back from the selected server.

In another aspect of the present invention associated with a server computer, a method and apparatus for dynamic distributed computing is provided. Initially, the server will automatically determine which task types are available on the server and will download task types from the network as necessary. These task types help the server unmarshal parameters and data from a task request and generate a local task. Next, the server invokes a generic compute method capable of processing all types of compute tasks or subtypes of a compute task. The generic compute method is used to execute the task request on the selected server. If a subsequent task will use the results, the server stores the results from the computed tasks in a local cache. Once the task has completed, the server returns the results, or the computed task, to the client.

BRIEF DESCRIPTION OF THE DRAWINGS

The accompanying drawings, which are incorporated in and constitute a part of this specification, illustrate an embodiment of the invention and, together with the description, serve to explain the advantages, and principles of the invention.

In the drawings.

DETAILED DESCRIPTION OF THE INVENTION

Introduction

Figure 1:
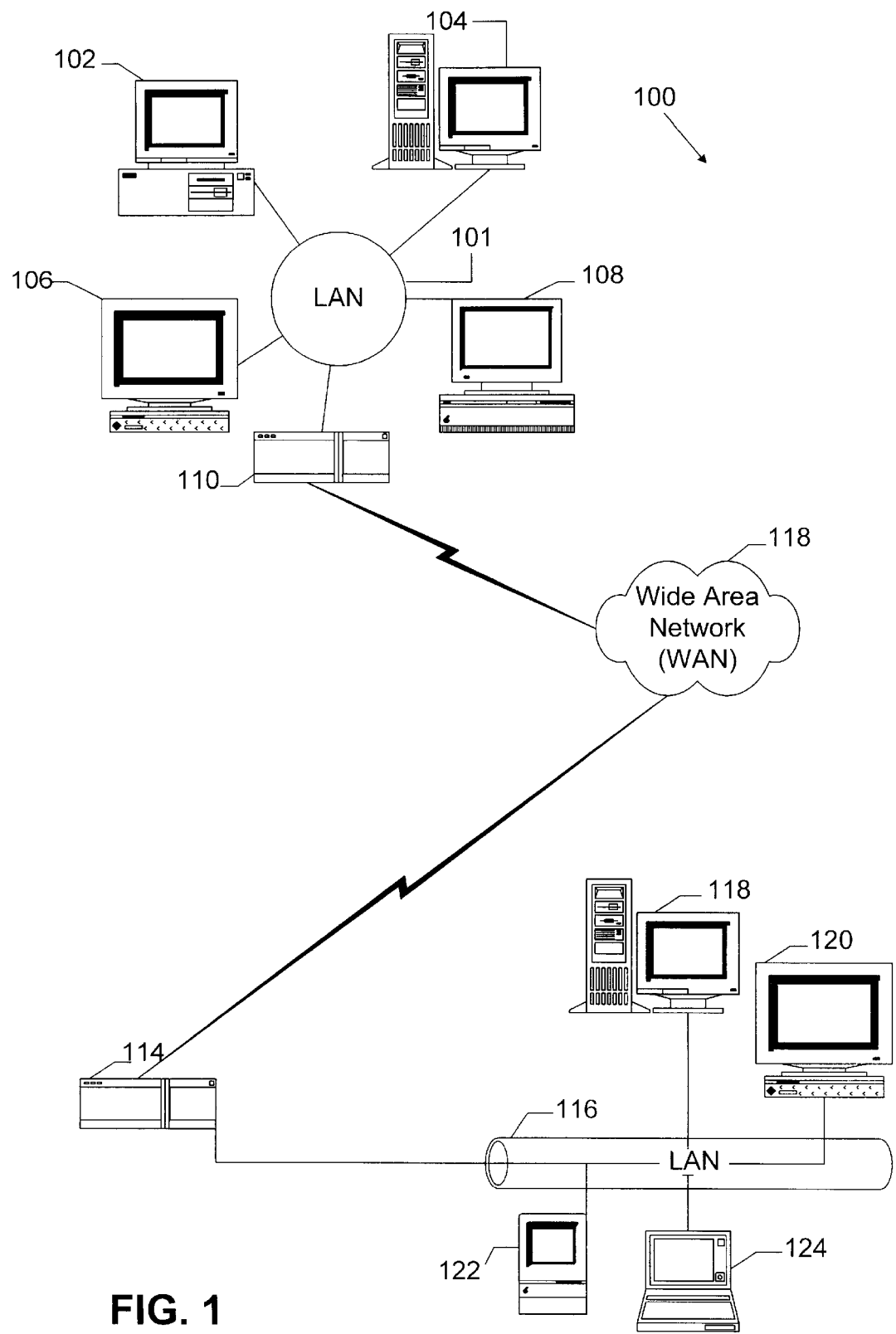
FIG. 1. illustrates a network suitable for use with methods and systems consistent with the present invention.

Reference will now be made in detail to an implementation of the present invention as illustrated in the accompanying drawings. Wherever possible, the same reference numbers will be used throughout the drawings and the following description to refer to the same or like parts.

Systems consistent with the present invention address shortcomings of the prior art and provide a dynamic distributed computing system used over a network of server computers. This dynamic distributed computing system is particularly useful in heterogenous computer networks having computers with different processors, different operating systems, and combinations thereof. Such a system allows a client application to select a server computer at runtime to execute a particular task. In method and systems consistent with the present invention, the task is an object having a particular type or class definition. The server can generally defer knowing the actual class definition until the parameters and data associated with the object task are received on the server. Consequently, the particular type is downloaded by the server if it is not available on the server. For example, if an object instance of an unknown class is transmitted to the server, the server downloads the unknown class. The server then uses this class to process the object. This late association of a class definition to an object increases the flexibility in processing complex tasks over a network of server computers. Further, the present design facilitates this flexibility with minimal additional overhead by utilizing features in existing remote procedure call subsystems such as the Remote Method Invocation (RMI) subsystem developed by Sun Microsystems, Inc. of Mountain View, Calif. For more information on Remote Method Invocation (RMI) see co-pending U.S. Patent Application, "System and Method For Facilitating Loading of "Stub" Information to Enable a Program Operating in One Address Space to Invoke Processing of a Remote Method or Procedure in Another Address Space" having Ser. No. 08/636,706, filed Apr. 23, 1996 by Ann M. Wollrath, James Waldo, and Roger Riggs, assigned to a common assignee and hereby incorporated by reference. Also, RMI is also described in further detail in the RMI specification on the JavaSoft WebPage at FTP://ftpjavasoft.com/docs/jdk1.2/rmi-spec-jdk1.2.ps, which is also hereby incorporated by reference.

Unlike conventional systems, a task in the dynamic distributed system consistent with the present invention can be written once and executed on any server computer in a network. This capability is particularly advantageous in a heterogeneous network because the task does not have to be ported to every platform before it is executed. Instead, a generic compute task designed in accordance with the present invention is loaded on each system. This generic compute task is capable of executing a wide variety of tasks specified by the client at runtime. For example, one can develop a type called "Compute" and a generic compute task which accepts the "Compute" type in an object-oriented language, such as Java. Java is described in many texts, including one that is entitled "The Java Language Specification" by James Gosling, Bill Joy, and Guy Steele, Addison-Wesley (1996), which is hereby incorporated by reference. The client creates a task having a subtype of the type "Compute" and passes an object corresponding to task to the generic compute task on the server. A remote procedure call mechanism downloads the object to the server and the generic compute task which executes the task.

In Java, the task transmitted by the client is actually an object including a series of bytecodes. These bytes codes can be executed immediately as long as the server implements a Java Virtual Machine (JVM). The JVM can be implemented directly in hardware or efficiently simulated in a software layer running on top of the native operating system. The Java language was designed to run on computing systems with characteristics that are specified by the Java Virtual Machine (JVM) Specification. The JVM specification is described in greater detail in Lindholm and Yellin, *The Java Virtual Machine Specification,* Addison-Wesley (1997), which is hereby incorporated by reference. This uniform JVM environment allows homogeneous execution of tasks even though the computer systems are heterogenous and have different processors, different operating systems, and combinations thereof. Combining a powerful remote procedure call subsystem with a generic compute task on the server, designed in accordance with the present invention, results in a powerful dynamic distributed computing environment.

A compute server using bytecodes can process a task much faster than systems using conventional text based scripting languages or other character based languages. Each bytecode is compact (8 bits) and is in a numeric format. Consequently, the server computer does not spend compute cycles parsing the characters and arguments at run time. Also, the bytecodes can be optimized on the client before transporting them to the server. The server optionally can convert the bytecodes to native instructions for execution directly on the hardware at run time using a processing mechanism such as a Just-in-Time (JIT) compiler. For more information on JIT compilers see *The Java Virtual Machine Specification.*

A system designed in accordance with the present invention assumes that each client is capable of communicating to each server over a common networking protocol such as TCP/IP. Also, it is assumed that there is a remote procedure call (RPC) subsystem on the client and server which is capable of receiving remote requests from a client and executing them on the server. This RPC system also automatically downloads code and related information needed for performing the task at run time. RMI developed by Sun Microsystems, Inc. is a suitable RPC subsystem providing these features. One skilled in the art, however, will appreciate that other RPC subsystems, such as DCOM/COM from Microsoft, Inc., may be used in lieu of RMI.

Computer Network

FIG. 1 illustrates a network 100 in which one embodiment of the present invention can be implemented. Network 100 includes Local Area Network (LAN) 101, backbone or Wide Area Network (WAN) 112, and Local Area Network (LAN) 116 in its essential configuration. LAN 101 includes a series of work stations and server computers 102, 104, 106, and 108. LAN 116 includes a series of work stations and server computers 118, 120, 122, and 124. These computer systems 102–108 and 118–124 are coupled together to share information, transmit data, and also share computational capabilities. LAN 101 is coupled to the larger overall network using a network interconnect device 110. The specific type of network interconnect device can be a router, a switch, or a hub depending on the particular network configuration. In general, network interconnect device 110 includes routers, switches, hubs or any other network interconnect device capable of coupling together a LAN 101, a WAN 112, and LAN 116 with user terminals into an integrated network. Network interconnect device 114 can also include routers, switches, hubs, or any other network interconnect device capable of coupling the computers on LAN 116 with user terminals into an integrated network. In general, a dynamic distributed computing system designed in accordance with the present invention is typically located on each computer system coupled to network 100 . Accordingly, each computer may operate as either a client or a server depending on the particular request being made and the services being provided. Typically, the client requests that a task is computed on a server computer and the server computer will process the task.

Computer System

Figure 2:
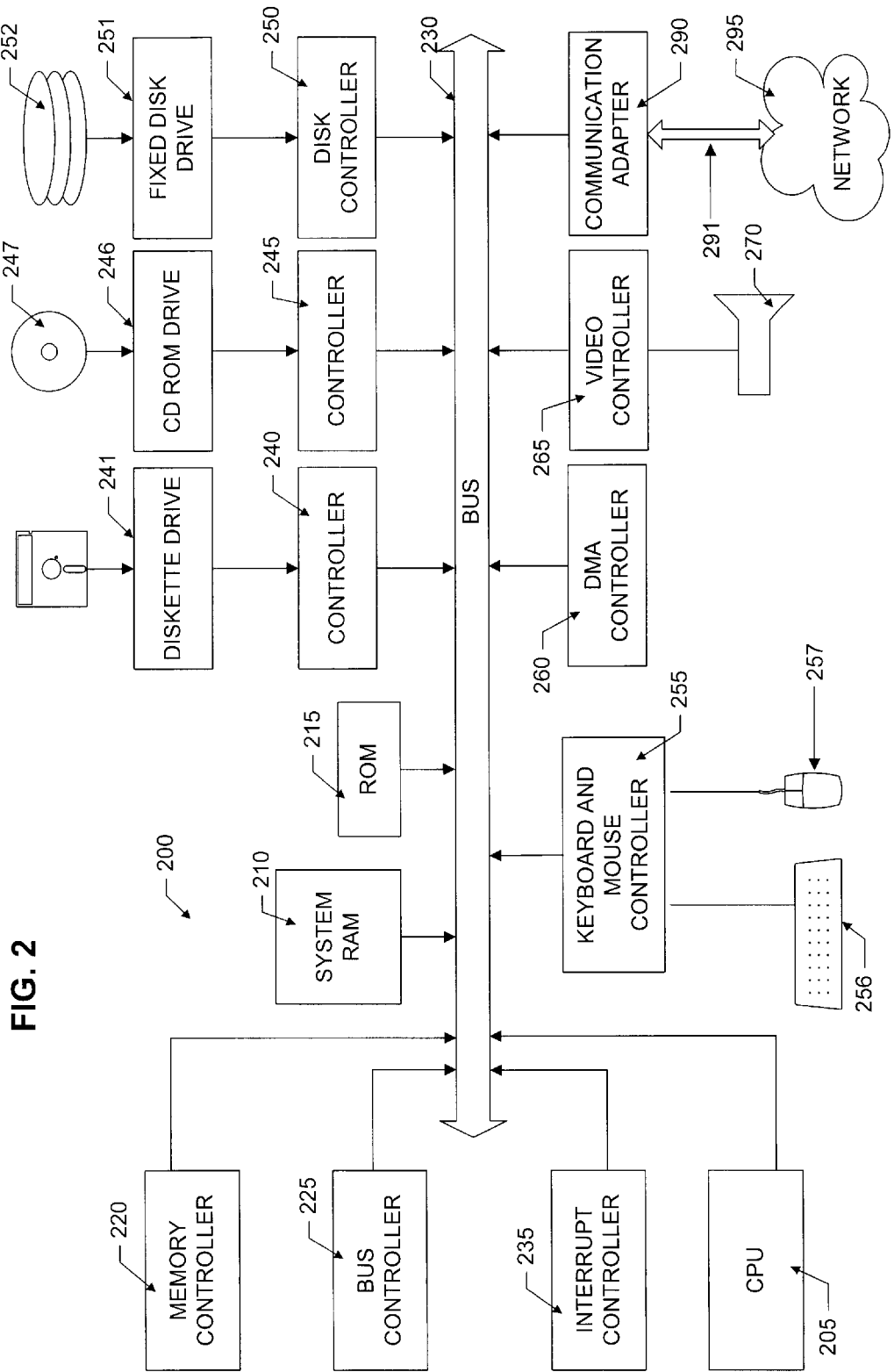
FIG. 2 is block diagram of a computer system suitable for use with methods and systems consistent with the present invention.

Referring now to FIG. 2, the system architecture for a computer system 200 suitable for practicing methods and systems consistent with the present invention is illustrated. The exemplary computer system 200 is for descriptive purposes only. Although the description may refer to terms commonly used in describing particular computer systems, such as in IBM PS/2 personal computer, the description and concepts equally apply to other computer systems, such as network computers, workstation, and even mainframe computers having architectures dissimilar to FIG. 1.

Furthermore, the implementation is described with reference to a computer system implementing the Java programming language and Java Virtual Machine specifications, although the invention is equally applicable to other computer systems having similar requirements. Specifically, the present invention may be implemented with both object-oriented and nonobject-oriented programming systems.

Computer system 200 includes a central processing unit (CPU) 105, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disk 252 is part of a fixed disk drive 251 which is connected to bus 230 by controller 250.

User input to computer system 200 may be provided by a number of devices. For example, a keyboard 256 and mouse 257 are connected to bus 230 by controller 255. It will be obvious to those reasonably skilled in the art that other input devices, such as a pen and/or tablet may be connected to bus 230 and an appropriate controller and software, as required. DMA controller 260 is provided for performing direct memory access to RAM 210. A visual display is generated by video controller 265 which controls video display 270.

Computer system 200 also includes a communications adaptor 290 which allows the system to be interconnected to a local area network (LAN) or a wide area network (WAN), schematically illustrated by bus 291 and network 295.

Operation of computer system 200 is generally controlled and coordinated by operating system software. The operating system controls allocation of system resources and performs tasks such as processing scheduling, memory management, networking, and services, among things.

Dynamic Distributed Computing

Dynamic distributed computing is generally a client server process. The client-server relationship is established for each call being made and generally the roles can change. Typically, the client is defined as the process making a call to request resources located or controlled by the server. In this context, the computer or processor executing the requesting process may also be referred to as a client. However, these roles may change depending on the context of information and particular processing which is taking place.

Figure 3:
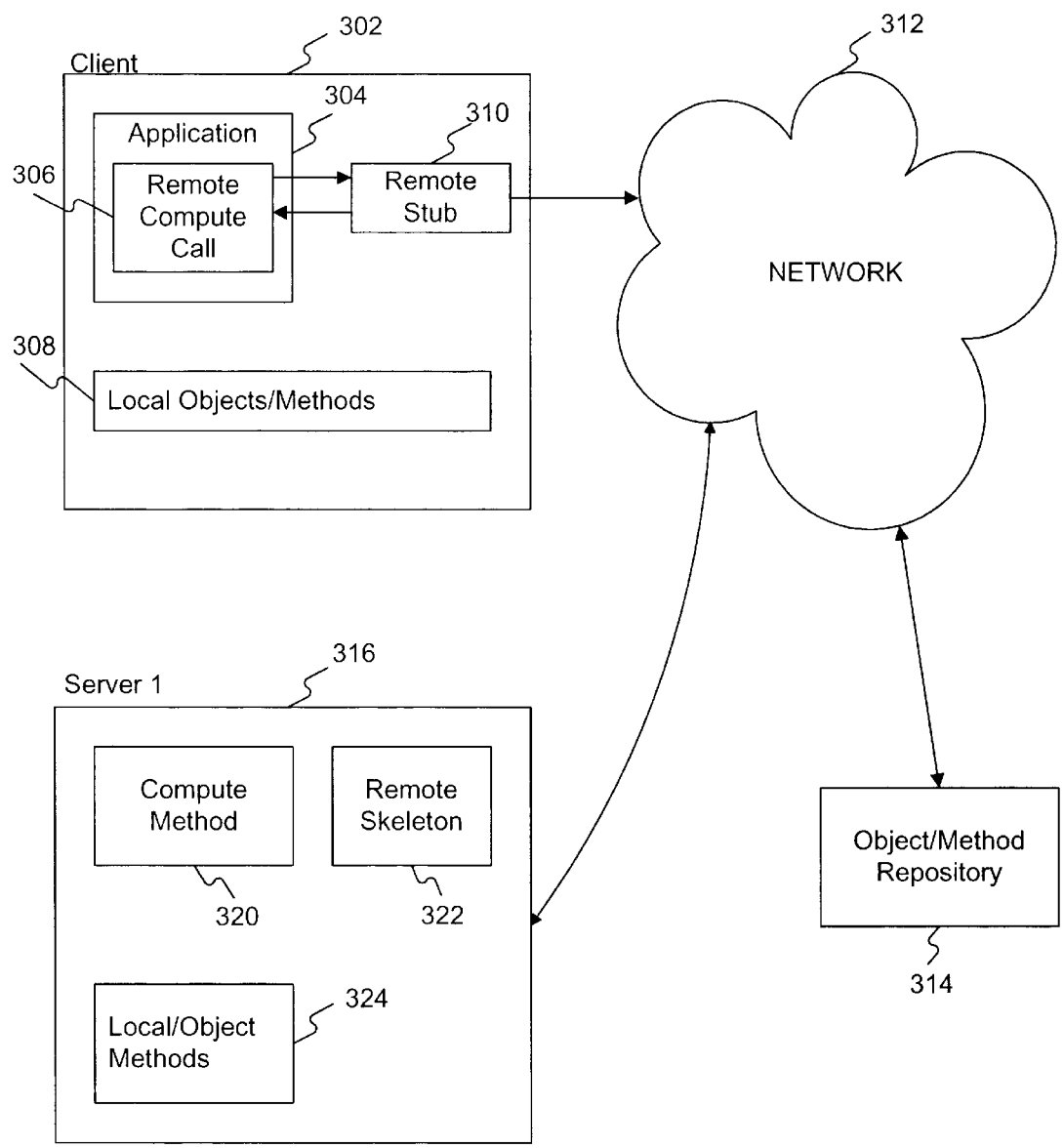
FIG. 3 is a block diagram representation of a client-server networking environment suitable for use with methods and systems consistent with the present invention.

FIG. 3 is a block diagram representation of a client-server networking environment used to implement one embodiment of the present invention. This diagram includes those subsystems closely related to the present invention to emphasize one embodiment of the present invention. Additional subsystems, excluded in FIG. 3, may be necessary depending on the actual implementation.

Accordingly, FIG. 3 includes a client 302, a server 316, and an object/method repository 314 which are all operatively coupled to a network 312. Client 302 includes an application 304 which makes a remote compute call 306 to process a task on a remote server computer. A remote stub 310, typically generated using a remote procedure call subsystem, as described in the RMI specification, is used to package parameters and data associated with the specific remote compute call 306. The typical client can also includes a collection of local objects/methods 308 which may contain the type of task client 302 calls remote compute call 306 to execute. Alternatively, the tasks can be located in object method repository 314 and are accessed by compute method 320 as needed. Server 316 includes a remote skeleton 322 to unmarshal the parameters and data transmitted from the client. Remote skeleton 322 prepares information for use by compute method 320. A local objects/methods 324 also includes tasks client 302 can ask the server 316 to process.

In operation, remote compute call 306 makes a call to a compute method 320 to process a particular task. A remote stub 310 marshals information on the calling method so that a compute method 320 on server 316 can execute the task. Remote stub 310 may also marshal basic parameters used as arguments by compute method 320 on server 302. Remote skeleton 322 receives the task and unmarshals data and parameters received over the network and provides them to compute method 320. If the task and related types are not available on server 316, the skeleton downloads the types from client 302, object/method repository 314, or some other safe and reliable source of the missing types. The type information maps the location of data in the object and allows the remote skeleton to complete processing the object. RMI (not shown) is one remote procedure call (RPC) system capable of providing remote stub 310 and remote skeleton 322. Once the object is processed by the skeleton, compute method 320 executes the task and returns the computed task or computed task results to client 302.

Figure 4:
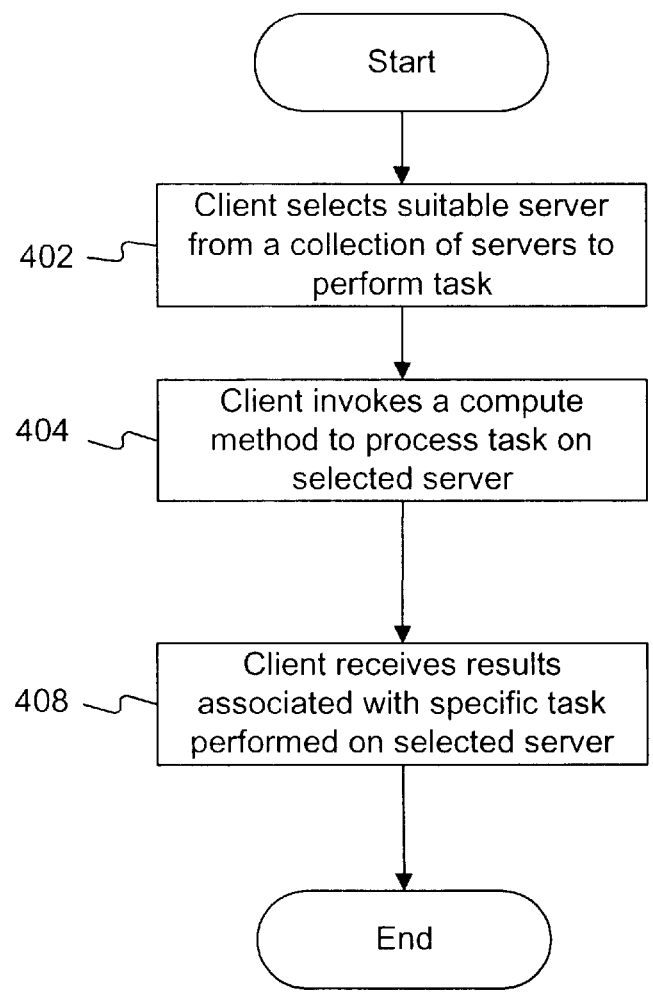
FIG. 4 is a flow chart of the steps a client performs in accordance with methods and systems consistent with the present invention.

FIG. 4 is a flow chart of the steps performed by a client when utilizing the dynamic distributed computing system and method consistent with the present invention. Initially, the client selects a suitable server from the network to process the task (step 402). The selection criteria can be based upon the overall processing load distribution among the collection of server computers or the specialized computing capabilities of each server computer. For example, load balancing techniques may be used to automatically determine which computer has the least load at a given moment. Further, some computers having specialized hardware, such as graphic accelerators or math co-processors, may be selected by the client because the task has intense graphic calculations, such as rendering three dimensional wireframes, or must perform many floating point calculations.

Once the server is selected, the client invokes a remote compute method on the selected server (step 404). An RPC system, such as RMI, facilitates invoking the remote compute method on a server computer. Typically, the client need only know that the remote compute method can be used as a conduit to process a particular task on a remote computer. For example, in Java the remote instruction "Server.runTask (new PI(1000))" executed on a client causes a remote method "runTask" to be invoked on a remote server "Server" of type "ComputeServer". This step provides the task (in this case the task is a type task object instantiated by the "new PI(1000))" as a parameter to the generic compute method through the remote method "runTask". The "runTask" method on the server implements a Compute remote interface. Optionally, this instruction can indicate to the server that results from the computed task should be stored in a result cache on the selected server. This enables subsequent tasks to share the results between iterations. For example, the results from calculating "PI" may be used later by another remote method to compute the volume of a sphere or perform another precise calculation using the value of "PI".

A stub is used to marshal parameters and data into a task request. The task request is then provided to the selected server. Typically, the task request includes data and parameters for the task as well as a network location for the type or class if it is not present on the server. A skeleton on the server uses the type or class information to process the object and unmarshall data and parameters. In a system using Java and RMI, the task request is an object and the class location information is contained in a codebase URL (universal record locator) parameter. Further details on this are contained in the RMI Specification. The server can schedule the task for execution immediately or whenever the server finds a suitable time for executing the task. After the server performs the computation, the client receives the results from the computed task (step 408).

Figure 5:
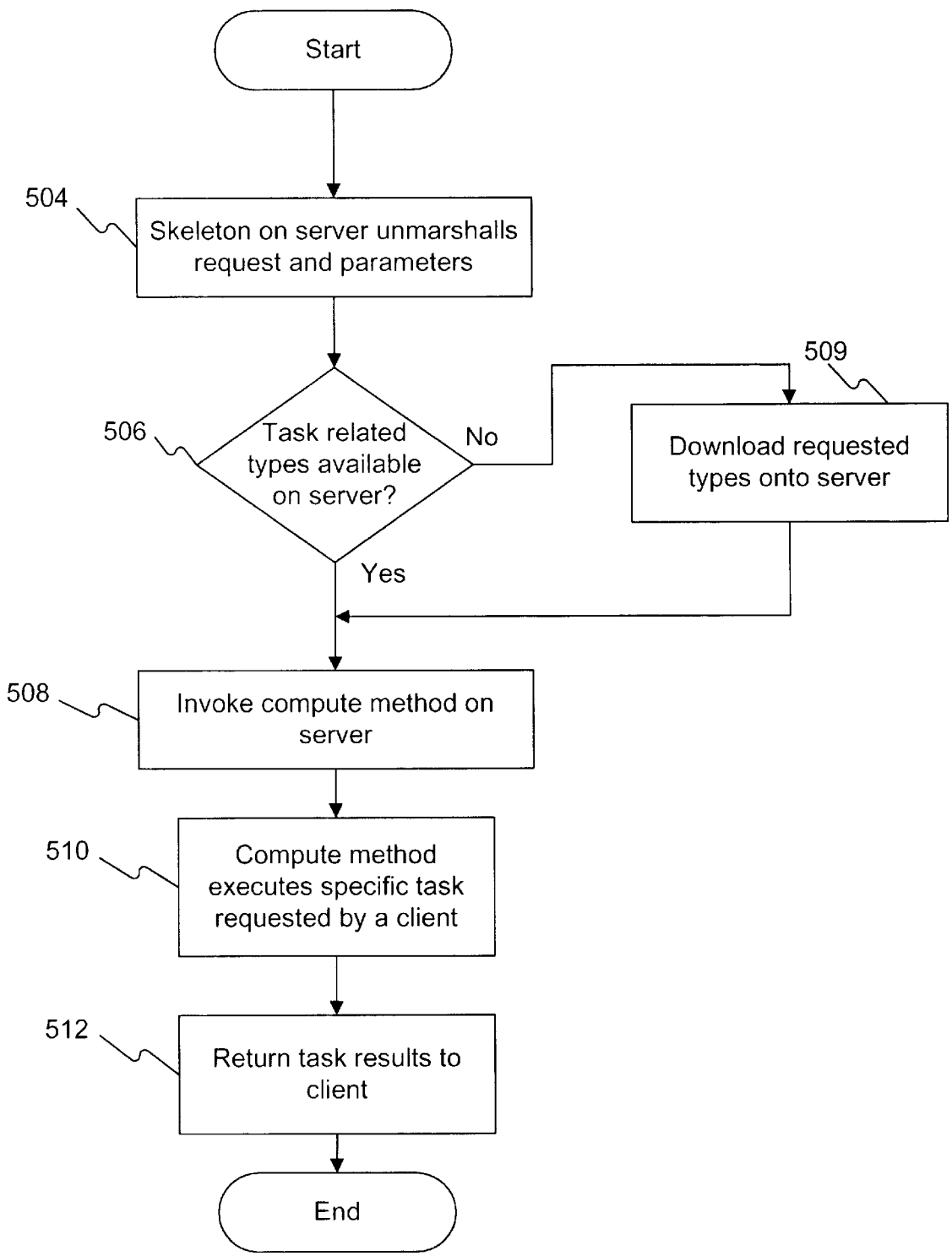
FIG. 5 is a flow chart the steps performed by a server in accordance with methods and systems consistent with the present invention.

FIG. 5 is a flow chart of the steps performed by the dynamic distributed computing system and methods consistent with the present invention. Initially, a skeleton on the server unmarshalls parameters and data from a task request and recreates the original task as transmitted (step 504). Unmarshalling these parameters may include downloading several additional types. The skeleton determines if the types related to the task request are available on the server (step 506). If the types associated with the task request are not available, the skeleton must download the tasks from one of the areas on the network (step 509). For example, if a "PI( )" class is not on the server, the skeleton server will down load this type from the client. The type or class is used by the skeleton to map data in the object and marshall parameters and data.

Typically, the client will indicate in the request package where the particular type is located. The skeleton can download the requested type from a object/method repository and can cache the type for future server requests. Also, the requested type could also be located on the client. For example, in Java and RMI the class containing the particular type is located in the given codebase URL (universal record locator) transmitted by the client. Dynamic class loading features in RMI facilitate the automatic downloading of the class using the codebase. These types enable the skeleton to parse the task request and extract the appropriate data and parameters. The steps outlined above make the parameters and data readily available for further processing.

Once the appropriate types are available, the skeleton invokes the generic compute method (step 508). The generic compute method on the server then executes the specific task requested by the client (step 510). For example, assume the client calls "ComputeServer.runTask(new PI(1000))". The skeleton will invoke the generic compute method "runTask" on the server. The "runTask" method calls the "run( )" method embedded in the task called by the client. Further, the "runTask" method implements the remote interface "Compute" which maintains the remote connection with the client. At the option of the client or a predetermined setting on the server, the skeleton stores results from the computed tasks in a cache if a subsequent task will use the results. As a final step on the server, the computed task or results are returned to the client by executing "return t.run( )" on the server (step 512).

Exemplary Implementation

Consistent with the present invention, the following code sample is provided as one implementation. Although this example is provided in the object-oriented Java programming language other programming languages could also be used. For example, the server can include the following Java code:

```
THE TASK
public interface Task extends Serializable {
                //This interface allows a class (the "PI"
                // class ) to implement the abstract
                // run() class
{
    Public Object run();
}
THE REMOTE INTERFACE:
import java.rmi.*;
public interface Compute extends Remote {
                // The RMI/RPC Interface
public Object runTask(Task t) throws RemoteException;
                //The abstract runIt method
}
THE COMPUTE SERVER IMPLEMENTATION
import java.rmi.*;
import java.rmi.server.*;
public class ComputeServer extends UnicastRemoteObject
implements Compute {
    public ComputeServer ()throws RemoteExecption{}
                //Implements the Compute interface
                //abstract "runTask" method
// ... Code in this area is used for initializing the routine with RPC system
    public Object runTask (Task t) throws RemoteException
                // runTask implements the abstract
        method
```

-continued

```
                // defined in ComputerServer interface
        return t.run();    //
    }
    The following exemplary Java code can be used on a client performing
dynamic distributed computing consistent with the present invention.
        class PI {
        private int precision;
PI (int howManyPlaces) { // sets precision of PI value to be calculated later
        precision = howManyPlaces;
        }
public Object run() {    // implement the abstract run method in the
                         // compute interface
    double pi = computePIsomehow(precision); // calcualate pi
    return new Double(pi);
}
public static void main (String[] args) {
ComputerServer server = getAComputerServer();   // Select a server from
                                                // the network
                                                // and store in remote
                                                // compute call to RMI
                                                // RPC abstract remote
                                                // interface
Double pi = server.runTask(new PI(1000));       // implement abstract remote
                                                // to execute a "pi" computation
                                                // defined in "PI" class.
System.out.println("PI seems to be "+pi);       // return results in "pi" variable
                                                // and print to standard out
```

While specific embodiments have been described herein for purposes of illustration, various modifications may be made without departing from the spirit and scope of the invention. Those skilled in the art understand that the present invention can be implemented in a wide variety of hardware and software platforms and is not limited to the traditional routers, switches, and intelligent hub devices discussed above. Accordingly, the invention is not limited to the above described embodiments, but instead is defined by the appended claims in light of their full scope of equivalents.

What is claimed is:

1. A method performed on a computer system having a primary storage device, a secondary storage device, a display device, and an input/output mechanism which enables a client to dynamically distribute to a server computer in a collection of server computers a task developed in a programming language compatible with each of the server computers, the method comprising the steps of:

selecting a server from a plurality of heterogenous servers to process a task based upon the overall processing load distribution among the collection of server computers and the specialized computing capabilities of each server computer;

marshalling parameters and data into a task request which further comprises the substeps of,
determining if code and data types related to the requested task are present on the selected server, and
downloading the code and related data types onto the selected server when the code or data types are not present on the selected server;

invoking a generic compute method associated with the selected server which executes the task and further comprises the substeps of,
providing the task as a parameter to the generic compute method, and
indicating to the server that results from a computed task should be stored in a result cache on the selected server for subsequent tasks to use; and receiving the computed task back from the selected server for further processing on the client.

2. A method performed on a processor contained within a computer system having a primary storage device, a secondary storage device, a display device, and an input/output mechanism which enables a server associated with a collection of servers to dynamically receive and process a task from a client computer wherein the task is in an executable programming language compatible with each of the server computers, the method comprising the steps of:

unmarshalling parameters and data from a task request into a task, which further comprises the substeps of,
determining if the types related to the task are available on the server, and
when the types related to the task are not available on the server, downloading the types onto the server from a location as indicated by the parameters provided by the client;

to invoking a generic compute method, which is capable of processing all types of tasks, which executes the task and generates results;

storing results from the executed tasks in a cache if a subsequent task will use the results; and returning the results from executed task to the client.

3. A computer readable medium containing instructions for controlling a computer system to perform a method for enabling a client to dynamically distribute to a server in a collection of servers a task developed in a programming language compatible with each of the servers, the method comprising the steps of:

selecting a server from a plurality of heterogeneous servers to process a task based upon an overall processing load distribution among the collection of servers and specialized computing capabilities of each server;

marshalling parameters and data into a task request which further comprises:
determining if code and data types related to the requested task are present on the selected server, and
downloading the code and related data types onto the selected server when the code or data types are not present on the selected server;

invoking a generic compute method associated with the selected server which executes the task and further comprises:
providing the task as a parameter to the generic compute method, and
indicating to the server that results from a computed task should be stored in a result cache on the selected server for subsequent tasks to use; and
receiving the computed task back from the selected server for further processing on the client.

4. A computer readable medium containing instructions for controlling a computer system to perform a method for enabling a server associated with a collection of servers to dynamically receive and process a task from a client computer wherein the task is in an executable programming language compatible with each of the servers, the method comprising the steps of:
unmarshalling parameters and data from a task request into a task, which further comprises:
determining if types related to the task are available on the server, and
when the types related to the task are not available on the server, downloading the types onto the server from a location indicated by the parameters provided by the client;
invoking a generic compute method, which is capable of processing all types of tasks, which executes the task and generates results;
storing results from the executed tasks in a cache if a subsequent task will use the results; and
returning the results from executed task to the client.

5. The method of claim 1, wherein the enviromnent includes a remote procedure call subsystem.

6. The method of claim 1, wherein the selected server has the lowest load characteristic compared with average load characteristic of the servers over a predetermined time period.

7. The method of claim 1, wherein the specialized computing capabilities include a capability to render images.

8. The method of claim 1, wherein the results comprise an object.

9. The method of claim 2, wherein the task is developed using the Java programming language and environment.

10. The computer readable medium of claim 3, wherein the environment includes a remote procedure call subsystem.

11. The computer readable medium of claim 3, wherein selecting the server comprises selecting the server based on a lowest load characteristic compared to an average load characteristic of the servers over a predetermined period of time.

12. The computer readable medium of claim 3, wherein the specialized computing capabilities include a capability to render images.

13. The computer readable medium of claim 3, wherein the sending step further comprises:
providing the task as a parameter to the generic compute method.

14. The computer readable medium of claim 3, wherein the results comprise an object.

15. The computer readable medium of claim 4, wherein the task is developed using a Java programming language and environment.

16. The computer readable medium of claim 11, wherein the determining step and the downloading steps are performed by a remote procedure call (RPC) subsystem.

* * * * *

UNITED STATES PATENT AND TRADEMARK OFFICE
CERTIFICATE OF CORRECTION

PATENT NO.    : 6,446,070 B1
DATED         : September 3, 2002
INVENTOR(S)   : Kenneth C.R.C. Arnold et al.

It is certified that error appears in the above-identified patent and that said Letters Patent is hereby corrected as shown below:

Column 10,
Line 44, before "invoking" delete -- to --; and

Column 12,
Line 30, "claim 11" should read -- claim 4 --.

Signed and Sealed this

Third Day of December, 2002

JAMES E. ROGAN
*Director of the United States Patent and Trademark Office*